(12) United States Patent
Wildermuth et al.

(10) Patent No.: US 10,150,068 B2
(45) Date of Patent: Dec. 11, 2018

(54) WATER SEPARATOR ELEMENT COMPRISING WATER DETECTION ELECTRODES

(71) Applicant: MANN+HUMMEL GMBH, Ludwigsburg (DE)

(72) Inventors: Andreas Wildermuth, Marbach (DE); Helen Neubauer, Ludwigsburg (DE); Sven Weidinger, Weinstadt (DE); Gunther Kraft, Ludwigsburg (DE); Marco Goedecke, Freiberg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 6 days.

(21) Appl. No.: 15/418,026

(22) Filed: Jan. 27, 2017

(65) Prior Publication Data

US 2017/0157542 A1    Jun. 8, 2017

Related U.S. Application Data

(63) Continuation of application No. PCT/EP2015/067119, filed on Jul. 27, 2015.

(30) Foreign Application Priority Data

Jul. 29, 2014    (DE) .................. 10 2014 010 997

(51) Int. Cl.
*B01D 36/00*    (2006.01)
*F02M 37/22*    (2006.01)
*B01D 29/31*    (2006.01)

(52) U.S. Cl.
CPC ............ *B01D 36/005* (2013.01); *B01D 29/31* (2013.01); *F02M 37/221* (2013.01); *B01D 2201/291* (2013.01); *B01D 2201/298* (2013.01); *B01D 2201/4084* (2013.01)

(58) Field of Classification Search
CPC .......... B01D 35/006; B01D 2201/4084; B01D 2201/4046; B01D 2201/305; B01D 2201/291; B01D 2201/298; F02M 37/221
See application file for complete search history.

(56) References Cited

U.S. PATENT DOCUMENTS

| 9,649,583 | B2 * | 5/2017 | Gwin .................. B01D 35/143 |
| 9,724,628 | B2 * | 8/2017 | Morris ................ B01D 35/005 |
| 2010/0276352 | A1 * | 11/2010 | Mendel .............. B01D 35/143 210/235 |

(Continued)

FOREIGN PATENT DOCUMENTS

| DE | 102009029413 A1 | 3/2011 |
| DE | 102011078362 A1 | 1/2013 |
| DE | 102011081141 A1 * | 2/2013 ........... B01D 36/005 |

(Continued)

*Primary Examiner* — Terry K Cecil
(74) *Attorney, Agent, or Firm* — James Hasselbeck (57) ABSTRACT

A water separator element (14) for a fuel filter (10) having two water level electrodes (34, 36) for detecting backed-up water in a water collection chamber (32) of the fuel filter (10). The water level electrodes (34, 36) can be electrically contacted by means of two contact electrodes (40, 42), said contact electrodes (40, 42) being connected in an electrically conductive manner to the water level electrodes (34, 36). The disclosure further relates to a fuel filter comprising a water separator element of this type.

13 Claims, 10 Drawing Sheets

(56) References Cited

U.S. PATENT DOCUMENTS

2013/0083705 A1    4/2013  Ma et al.

FOREIGN PATENT DOCUMENTS

| DE | 102012221890 A1 | 6/2014 | | |
| DE | 102013221209 A1 | 4/2015 | | |
| EP | 1400271 A1 | 3/2004 | | |
| WO | WO-2010049208 A1 * | 5/2010 | ............. | B01D 35/18 |

* cited by examiner

WATER SEPARATOR ELEMENT COMPRISING WATER DETECTION ELECTRODES

TECHNICAL FIELD

The invention relates to a water separator element for a fuel filter of a motor vehicle.

PRIOR ART

A water separator element for filtering fuel of a motor vehicle is known from DE 2011 078 362 A1. The known water separator element is embodied in two stages for separating water. It has a particle filter medium and a final separator screen for separating water. The separated water collects in a water collection chamber. A water level sensor whose electrodes are conducted in a supporting rod of the fuel filter detects when the level of the accumulated water in the water collection chamber is too high.

Moreover, known from DE 10 2011 081 141 A1 is providing a dewatering device on a filter housing in order to be able to drain separated water out of the filter housing. The dewatering device is coupled to the filter housing via a snap-on connector.

WO 2010/049208 A1 discloses a filter device having a water sensor that in the structural unit is embodied with a heating circuit of the filter device. The water sensor has sensor pins that may be coupled to a socket connector via electrical contacts.

Known from US 2010/0276352 A1 is providing a filter with electrodes for detecting the water level. The electrodes are elastically prestressed and touch one another when the water separator element is in the uninstalled condition. Installing the water separator element causes the electrodes to separate from one another so that they are electrically insulated from one another and only conduct electrical current if the water level is too high. This means that the electrodes are used both for detecting the water level and for ensuring that the water separator element is correctly installed.

The reliability of water detection in the water collection chamber drops, however, due to wear and impurities in the fuel filter.

SUMMARY

The underlying object of the invention is therefore to make possible long-lasting reliable water detection in a fuel filter.

The object according to the invention is thus solved using a water separator element for a fuel filter of a motor vehicle, the water separator element having two water level electrodes for detecting accumulated water in a water collection chamber of the fuel filter and the water level electrodes being electrically contactable by means of two contact electrodes, wherein the contact electrodes may be connected in an electrically conductive manner to the water level electrodes.

When the water separator element is exchanged, the water level electrodes are replaced due to the arrangement of the water level electrodes on the water separator element. Water detection may therefore be long-lastingly reliable.

The water separator element advantageously has a particle filter medium that is supported on a center tube. In this case the water separator element is in the form of a filter element.

The water separator element may have a sedimentation opening for water separation. The sedimentation opening is preferably embodied on an end disk of the water separator element. The sedimentation opening is particularly preferably embodied in the form of a sedimentation gap.

Water separation occurs at particularly high efficiency when the water separator element has a coalescer medium, in particular in the form of a non-woven fabric.

For separating water, the water separator element may furthermore have a final separator screen, wherein the final separator screen is arranged or embodied in a screen support, the screen support being arranged or embodied radially to the water separator element. The water separating rate is increased significantly using the final separator screen.

A first contact electrode may be embodied radial to the water separator element longitudinal axis.

Both contact electrodes are preferably embodied annular radial to the water separator element longitudinal axis. Using the annularly embodied contact electrodes, the screen support may be mounted, rotated about the water separator element in practically any manner, the electrical connection to the water level electrodes being provided in every case.

The water level electrodes may be embodied in one piece/integrally with the contact electrodes. In this way it is possible to reliably ensure the electrical connection between the water level electrodes and the contact electrodes.

The contact electrodes may be arranged or embodied, at least in part, on an end plate of the water separator element. Because of this, the contact electrodes may be easily contacted by tapping electrodes arranged on the filter housing.

At least one connecting line between a water level electrode and a contact electrode may run in the screen support. Alternatively or in addition thereto, a connecting line may run in a center tube.

A first water level electrode is preferably connected via an electrical connecting line to a first contact electrode that is outwardly disposed relative to the water separator element longitudinal axis, and a second water level electrode is connected to a second contact electrode that is inwardly disposed with respect to the water separator element longitudinal axis, at least part of the connecting line running embedded in the end plate between the second contact electrode and an under side of the end plate. Because of this the water level electrodes may be spaced essentially the same distance from the water separator element longitudinal axis without this resulting in a short circuit between the water level electrodes. Segments of the end plate act as insulators between the second contact electrode and the connecting line.

The screen support and/or the center tube may be connected via a snap-on connector to the end plate of the water separator element, the water level electrodes each being electrically connected to the contact electrodes via an interruptible resilient contact when the screen support is locked to the end plate. The screen support or the center tube is particularly easy to assemble because of the snap-on connector.

In another preferred embodiment of the invention, the contact electrodes are arranged or embodied in an interior chamber of the screen support, the contact electrodes each being contactable using a tapping electrode embodied resiliently, at least in part, and the tapping electrodes being arranged or embodied, at least in segments, oriented radially outward on a center tube element of the filter. A particularly easily assembled water separator element is attained using such an arrangement, the electrical connection of the water level electrodes arranged or embodied "below" on the screen support being guided "upward" via the tapping electrodes and beyond via the center tube element.

It is particularly preferred that the screen support be embodied closed at its under side facing the water level electrodes in the region of the center tube element. The lower part of the inner chamber of the screen support, i.e. the part of the inner chamber of the screen support that can be directed towards the water collection chamber, is preferably embodied closed. Because of this, it is possible to forego a seal between center tube element and screen support, and it is possible especially to forego assembling a sealing ring between center tube element and screen support.

It is possible to attain a particularly compact and easily assembled structure of the water separator element when the particle filter medium, the coalescer medium, the sedimentation opening, and the final separator screen are arranged successively radial to the water separator element longitudinal axis.

In another embodiment of the invention, the water separator element may have an electrically conductive shorting bridge for electrically bridging at least two filter housing electrodes arranged or embodied on the interior of the filter housing. Due to the electrically conductive shorting bridge, it may be assured that the water separator element is correctly inserted into the filter housing. Moreover, due to such a shorting bridge it may be assured that only original water separator elements are used in the filter housing, so that damage to the engine due to deficient imitation water separator elements is prevented.

The invention furthermore relates to a filter having a previously described water separator element and a filter housing that has a water collection chamber, the water level electrodes projecting, at least in part, into the water collection chamber when the water separator element is inserted into the filter housing.

BRIEF DESCRIPTION OF THE DRAWINGS

Additional features and advantages of the invention result from the following detailed description of a number of exemplary embodiments of the invention, using the figures in the drawings, which illustrate details essential to the invention, and from the claims.

The features depicted in the drawings are illustrated such that the special qualities of the invention may be rendered visibly clear. Each of the various features may be realized individually by itself or with other features in any combinations for variants of the invention.

FIG. 1b is a partial view of the left side of the first water separator element from FIG. 1a;

FIG. 1c is a partial view of the right side of the first water separator element from FIG. 1a;

FIG. 3c depicts a partial sectional view of the third water separator element from FIG. 3a;

FIG. 4b is a top view of a second filter housing for receiving the fourth water separator element from FIG. 4a;

FIG. 4c is a partial sectional view of the second filter housing according to FIG. 4b with fourth water separator element according to FIG. 4a inserted therein;

FIG. 6b is a perspective elevation of a fourth filter housing for receiving the sixth water separator element from FIG. 6a;

FIG. 7b is a perspective elevation of a fifth filter housing for receiving the seventh water separator element from FIG. 7a;

DETAILED DESCRIPTION

Figure 1A:
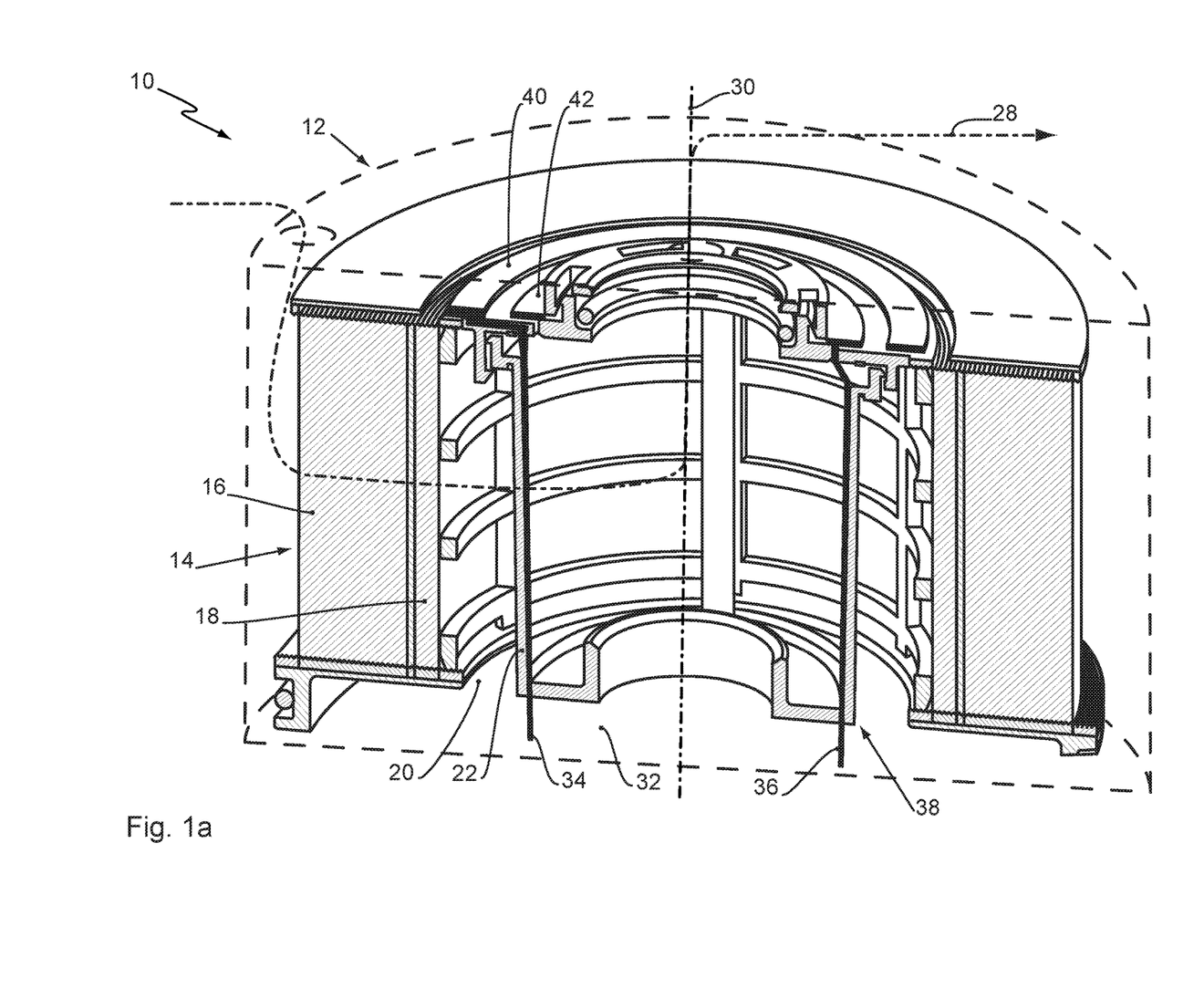
FIG. 1a is a sectional perspective elevation of a first water separator element in a highly schematic first filter housing.

FIG. 1a depicts a first filter 10 in the form of a fuel filter for a motor vehicle (not shown) having a first filter housing 12 that is merely indicated schematically with broken lines. A first water separator element 14 is inserted into the first filter housing 12. The first water separator element 14 has a particle filter medium 16, a coalescer medium 18, a sedimentation opening 20, and a final separator screen 22. For reasons of clarity, in FIG. 1a only the end faces of the final separator screen 22 are depicted. A dot-dash arrow 28 indicates the path of the fuel through the particle filter medium 16, the coalescer medium 18, the sedimentation opening 20, and the final separator screen 22. It may be seen that the particle filter medium 16, the coalescer medium 18, the sedimentation opening 20, and the final separator screen 22 are arranged radial to a water separator element longitudinal axis 30. The first water separator element 14 is embodied essentially axially symmetrical to the water separator element longitudinal axis 30.

Using the coalescer medium 18, the sedimentation opening 20, and the final separator screen 22, the fuel may be effectively freed of water in order to prevent engine damage. The separated water collects in a water collection chamber 32 of the first filter housing 12. If the water level in the water collection chamber 32 is too high, this is detected by the water level electrodes 34, 36. The water level electrodes 34, 36 and the final separator screen are arranged on a screen support 38. The water level electrodes 34, 36 may be electrically contacted via contact electrodes 40, 42. Particularly simple contacting of the contact electrodes 40, 42 and simple assembly of the first water separator element 14 is attained using an annular embodiment of the contact electrodes 40, 42: Using the annular embodiment of the contact electrodes 40, 42, the first water separator element 14, rotated as desired about the water separator element longitudinal axis 30, may be inserted into the first filter housing 12, and nevertheless always be correctly contacted. Water detection can always occur reliably because when the water separator element 14 is changed, the water level electrodes 34, 36 are also exchanged and thus replaced.

Figure 1B:
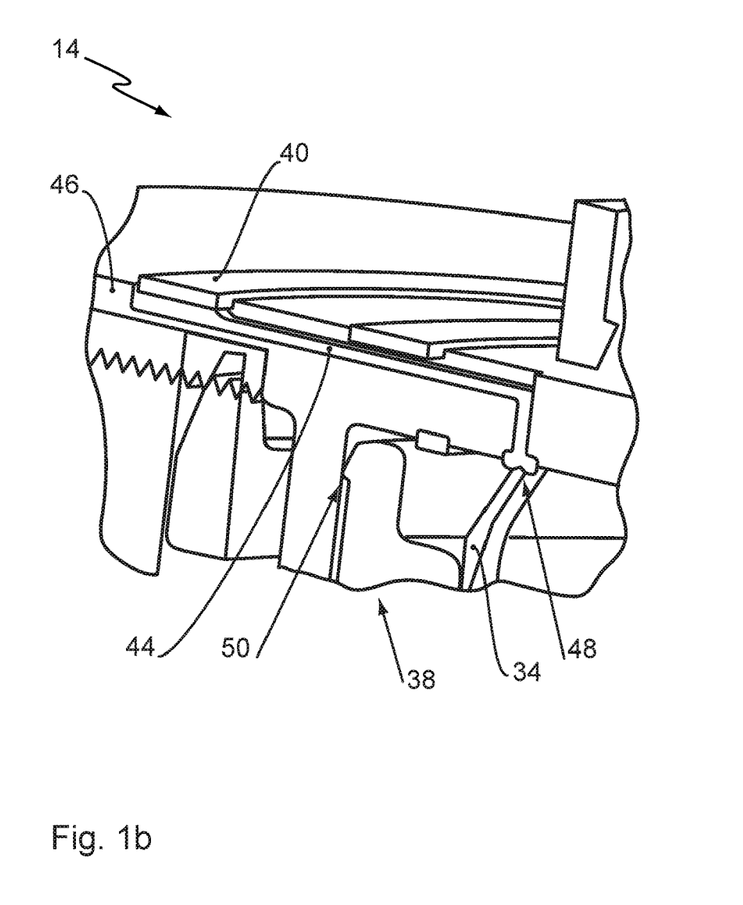

FIG. 1b is a partial view of the first water separator element 14. It may be seen from FIG. 1b that the radially exterior, first contact electrode 40 is electrically connected to the first water level electrode 34 via an electrical connecting line 44. The connecting line 44 runs embedded in an end plate 46 of the first water separator element 14. The first contact electrode 40 and the electrical connecting line 44 are embodied integrally. Moreover, the connecting line 44 and the first water level electrode 34 may be embodied integrally. In the present case, the connecting line 44 and the first water level electrode 34 are electrically connected via a first resilient contact 48. The screen support 38 may be connected to the end plate 46 of the first water separator element 14 via a snap-on connector 50. This permits particularly simple assembly of the screen support 38. When assembling the screen support 38, an electrically conductive connection between the first water level electrode 34 and the first contact electrode 40 is simultaneously created by the first resilient contact 48.

Figure 1C:
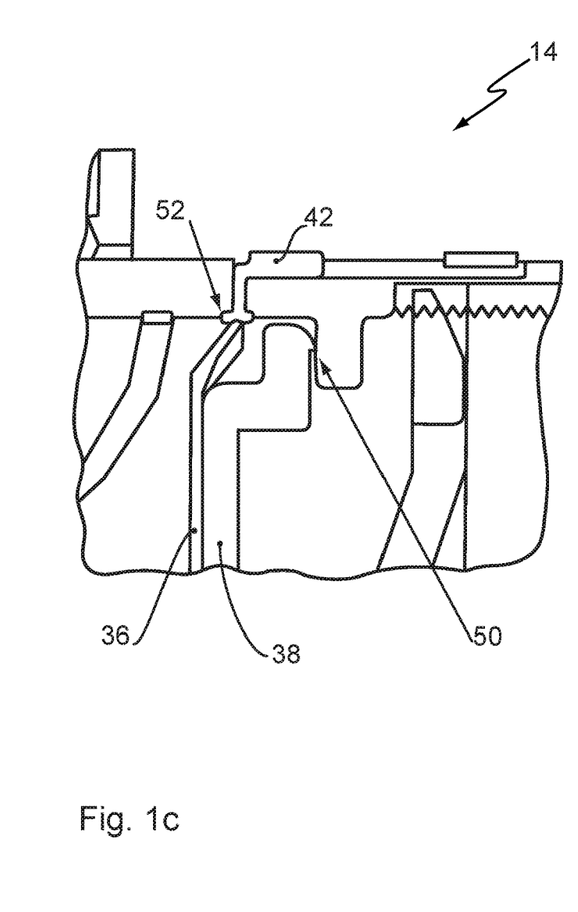

FIG. 1c is another partial view of the first water separator element 14. It may be seen from FIG. 1c that the radially inner, second contact electrode 42 is electrically connected to the second water level electrode 36 via a second resilient contact 52. When assembling the screen support 38 using the snap-on connector 50, an electrically conductive connection between the second water level electrode 36 and the second contact electrode 42 is simultaneously created by the second resilient contact 52.

Figure 2:
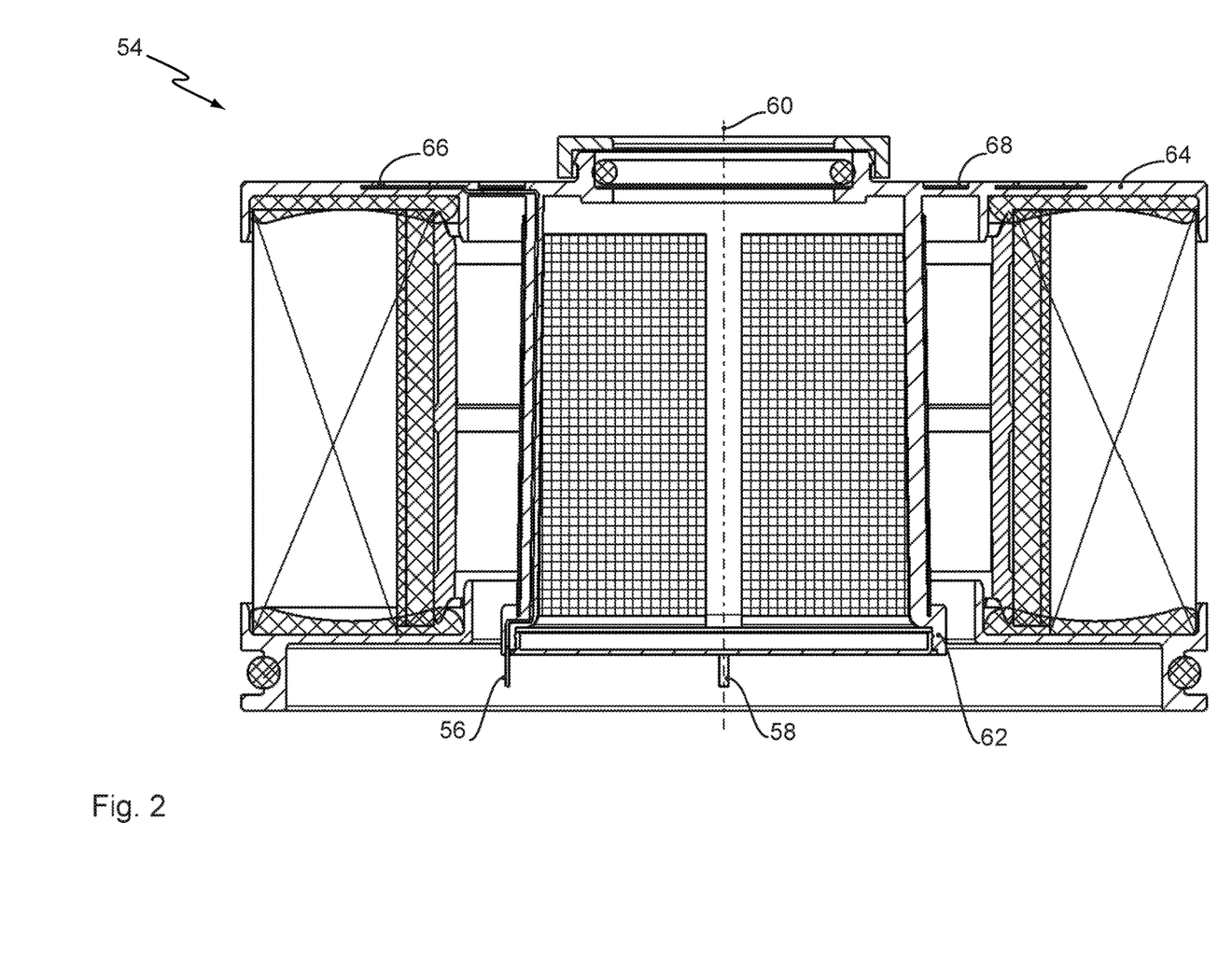
FIG. 2 is a sectional view of a second water separator element.

FIG. 2 depicts a second water separator element 54. The second water separator element 54 is identical to the first water separator element 14. However, water level electrodes 56, 58 are not positioned mutually diametrically like the water level electrodes 34, 36 (see FIG. 1a), but instead are spaced apart, at a right angle, about a water separator element longitudinal axis 60. Moreover, a screen support 62 is embodied integrally with an end plate 64, the first water level electrode 56 is embodied integrally with a first contact electrode 66, and the second water level electrode 58 is embodied integrally with a second contact electrode 68.

Figure 3A:
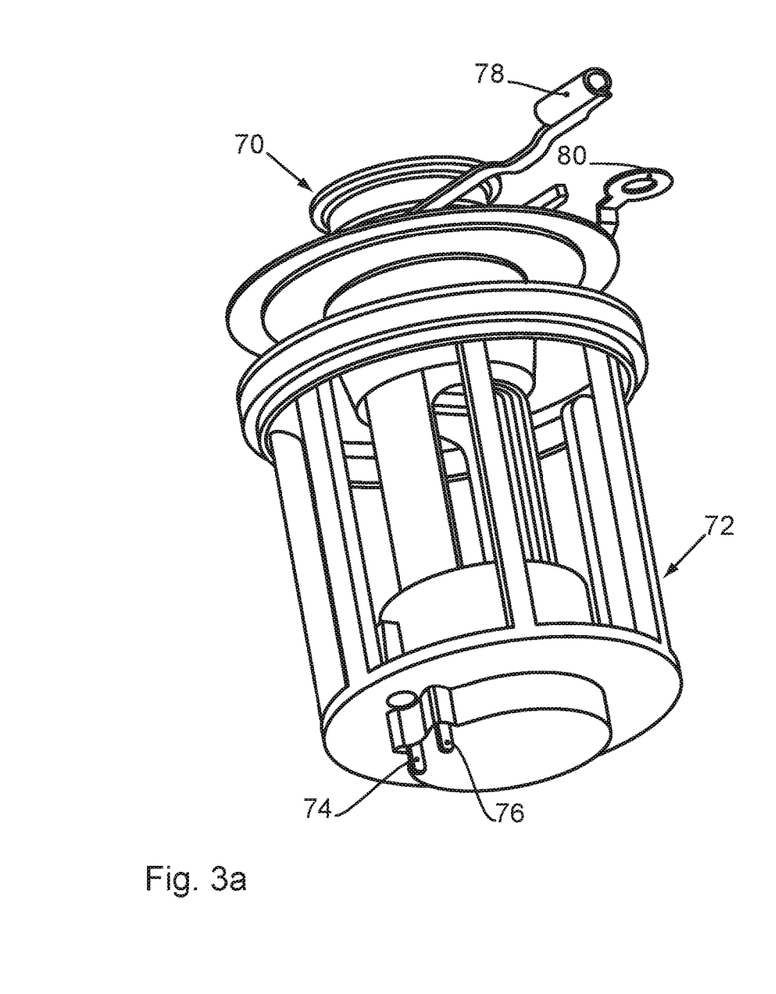
FIG. 3a depicts screen support and center tube element of a third water separator element.

FIG. 3a depicts a center tube element 70 of a fuel filter and a screen support 72 of a third water separator element. The center tube element 70 is not a part of a water separator element. The screen support 72 has water level electrodes 74, 76. The water level electrodes 74, 76 are each electrically connected to tapping electrodes 78, 80. On its outer circumference, the screen support 72 furthermore has a final separator screen, however for reasons of clarity it is not shown.

Figure 3B:
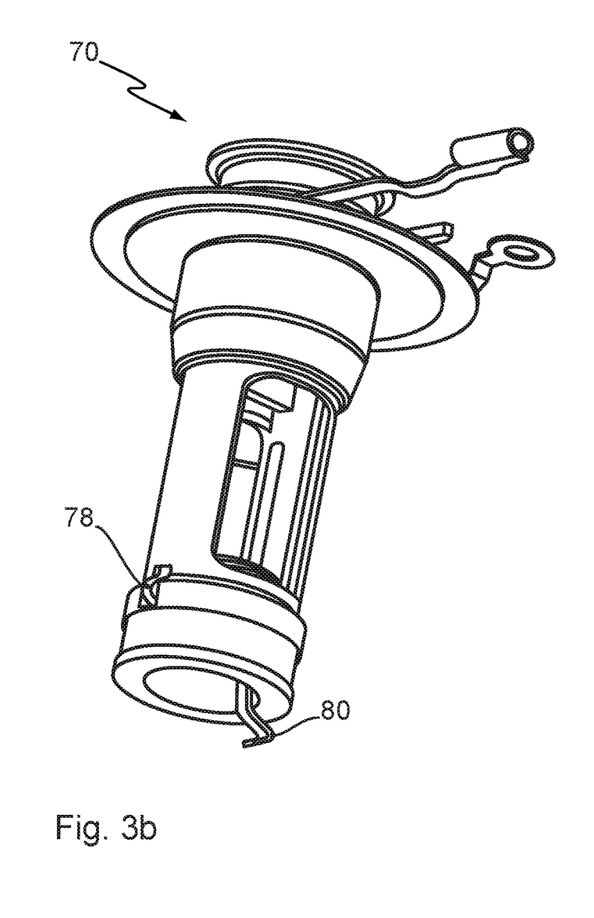
FIG. 3b depicts the center tube element from FIG. 3a, without screen support.

FIG. 3b depicts the center tube element. 70. It may be seen from FIG. 3b that segments of the tapping electrodes 78, 80 are embodied resiliently. The tapping electrodes 78, 80 produce an electrical connection to the water level electrodes 74, 76 (see FIG. 3a).

Figure 3C:
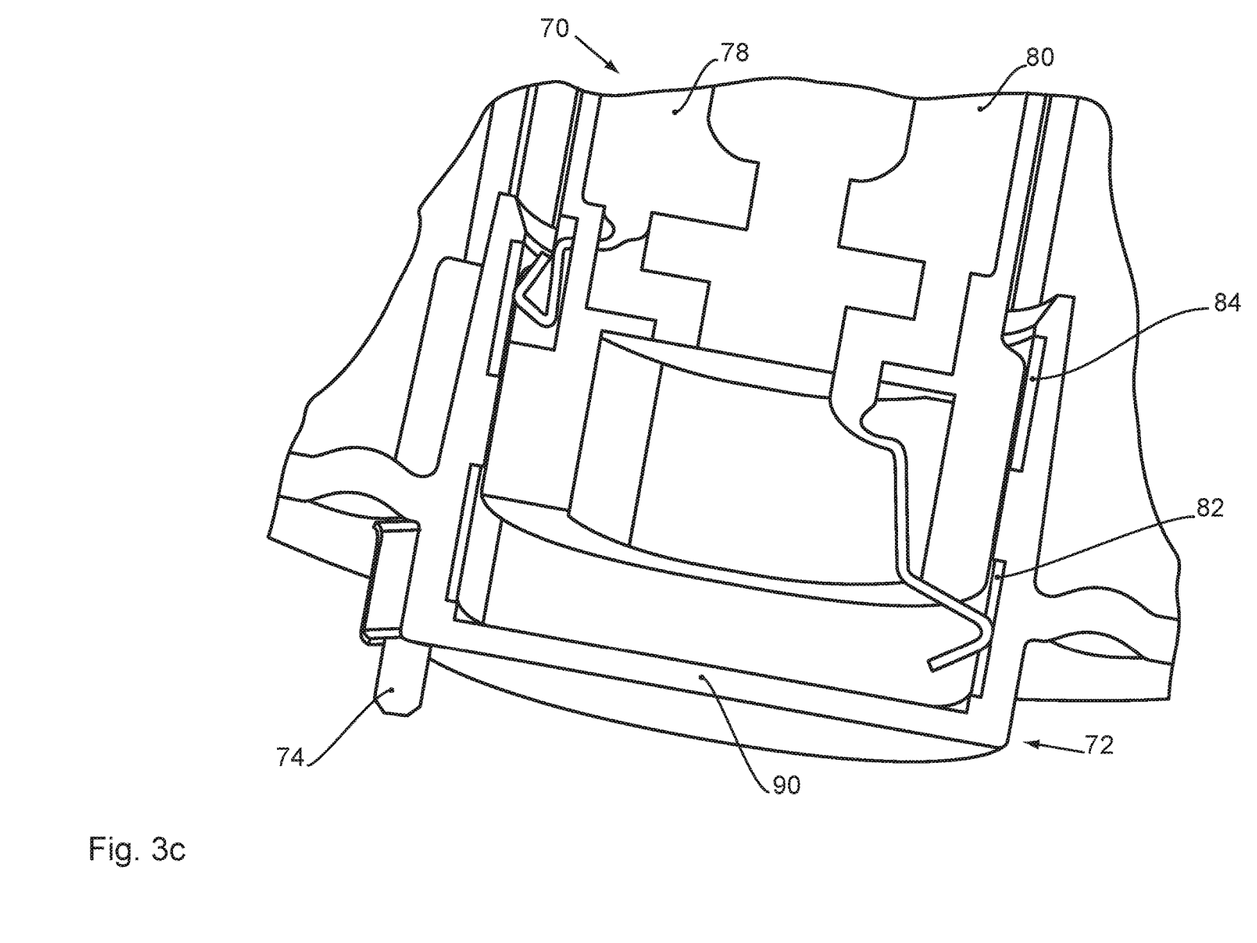

In a partial sectional view of the center tube element 70 and screen support 72 according to FIG. 3a, FIG. 3c illustrates how this electrical connection is produced. The water level electrodes 74, 76 (of which only the first water level electrode 74 is depicted in FIG. 3c) are each electrically connected to annular contact electrodes 82, 84. The water level electrodes 74, 76 (see FIG. 3a) are embodied integrally with the contact electrodes 82, 84, respectively. The contact electrodes 82, 84 are contacted by the tapping electrodes 78, 80, respectively, at least segments of which are resilient, and are each arranged, on the center tube element 70, with a segment oriented radially outward, and their resiliently embodied segments press against the contact electrodes 82, 84.

The screen support 72 is embodied closed on the under side 90 facing towards the water level electrodes 74, 76 (see FIG. 3a) in the region of the center tube element 70. Because of this it is possible to forego a seal, especially a sealing ring, between the center tube element and the screen support.

In the following, the outer embodiments of additional inventive water separator elements are described that have on their exterior additional electrically conductive shorting bridges for electrically bridging at least two filter housing electrodes arranged or embodied on an interior of the filter housing.

Figure 4A:
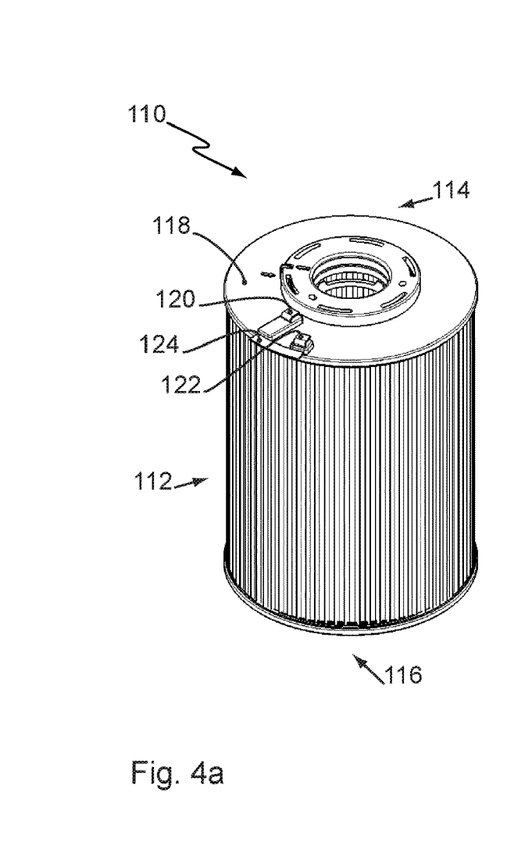
FIG. 4a is a perspective elevation of a fourth water separator element.

FIG. 4a depicts a fourth water separator element 110. The fourth water separator element 110 has a particle filter medium 112. The particle filter medium 112 is embodied as a pleated filter. The particle filter medium 112 is enclosed by a first end plate 114 and a second end plate 116.

A first water separator element electrode 120 and a second water separator element electrode 122 are arranged on the outwardly facing surface 118 of the first end plate 114. The first water separator element electrode 120 is connected to the second water separator element electrode 122 by means of a shorting bridge 124 in the form of an electrical lead. The electrical lead in the present case is embodied in the form of a metal strip.

Figures 4B, 4C:
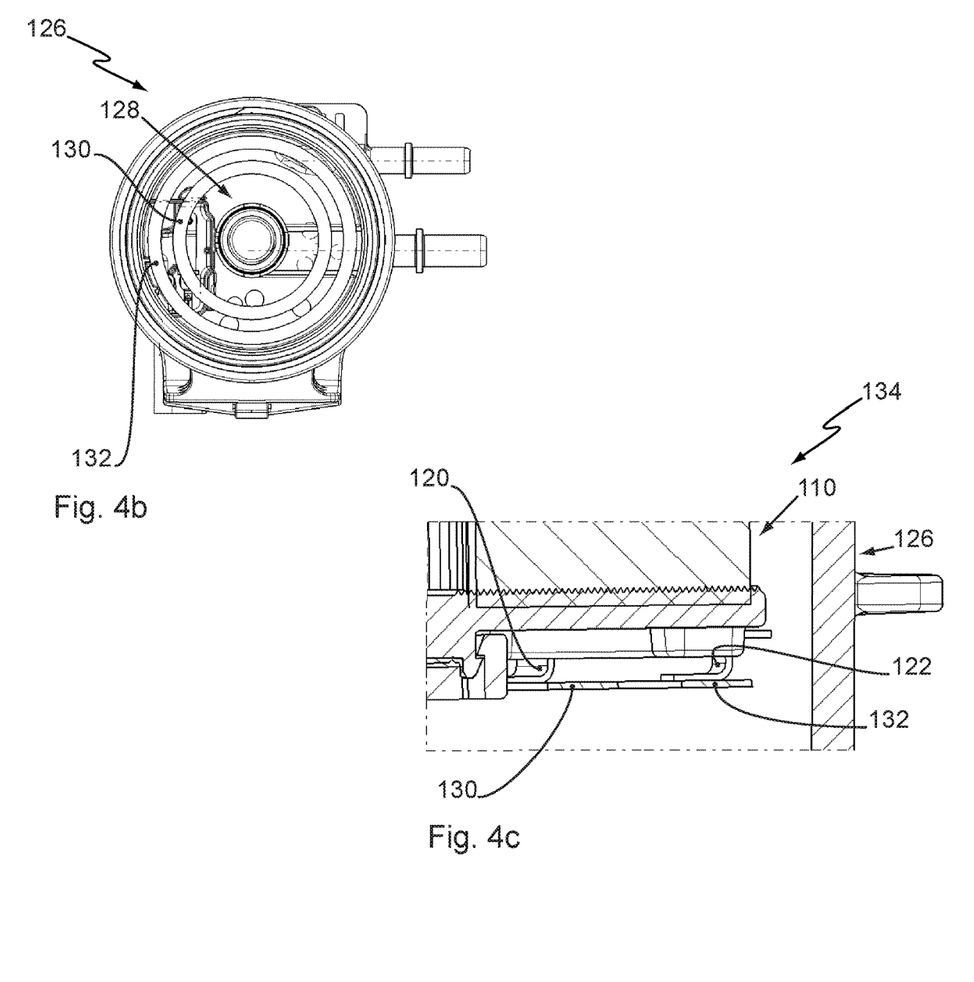

FIG. 4b illustrates a second filter housing 126 for receiving the fourth water separator element 110 according to FIG. 4a. The second filter housing 126 has a filter housing interior 128. The filter housing interior 128 faces the fourth water separator element 110 when the fourth water separator element 110 is inserted into the second filter housing 126.

A first filter housing electrode 130 and a second filter housing electrode 132 are arranged on the filter housing interior 128. The first filter housing electrode 130 is embodied radially symmetrical to the longitudinal axis of the second filter housing 126. In addition, the second housing electrode 132 is embodied radially symmetrical to the longitudinal axis of the second filter housing 126. The second filter housing electrode 132 is embodied concentric with the first filter housing electrode 130. In other words, the first filter housing electrode 130 and the second filter housing electrode 132 are embodied essentially in a tire shape or annularly with a common center point. The first filter housing electrode 130 comprises an electrically conductive material, preferably metal. In addition, the second filter housing electrode 132 comprises an electrically conductive material, preferably metal.

FIG. 4c depicts a second filter 134. The second filter 134 has the second filter housing 126 with fourth water separator element 110 therein, compared to "head down" as illustrated for FIG. 4a. The term "head down" shall be construed as a 180° rotation, the axis of rotation for this rotation running perpendicular to the longitudinal axis of the fourth water separator element 110. As may be seen from FIG. 1c, segments of the first water separator element electrode 120 and of the second water separator element electrode 122 are embodied curved. The first water separator element electrode 120 and the second water separator element electrode 122 thus have resilient properties. When fourth water separator element 110 is installed in the second filter housing 126, the first water separator element electrode 120 is in electrical and mechanical contact with the first filter housing electrode 130. When fourth water separator element 110 is installed in the second filter housing 126, the second water separator element electrode 122 is in electrical and mechanical contact with the second filter housing electrode 132.

A voltage may be applied between the first filter housing electrode 130 and the second filter housing electrode 132. Then a current flows from the first filter housing electrode 130 to the first water separator element electrode 120, via the shorting bridge 124 (see FIG. 1*a*), to the second water separator element electrode 122 and further to the second filter housing electrode 132. Depending on the polarity of the applied voltage, the current may also flow in the opposing direction. The current only flows if the fourth water separator element 110 is correctly installed in the second filter housing 126. Thus, by measuring the current flow, it is possible to discern that the fourth water separator element 110 is correctly installed in the second filter housing 126.

The current circuit described in the foregoing may furthermore have a known resistance. By measuring this resistance, it is easy to evaluate whether the fourth water separator element 110 is an original part or an imitation. Moreover, the current circuit described in the foregoing may have a known capacity and/or inductivity. By applying an alternating voltage between the first filter housing electrode 130 and the second filter housing electrode 132, and by measuring the resultant current, it is possible to precisely evaluate whether the fourth water separator element 110 is an imitation.

If a control element (not shown) detects that there is an imitation or that the fourth water separator element 110 is not correctly installed in the second filter housing 126, a visual or acoustic indication thereof may be provided to a user. If the second filter 134 is used in a motor vehicle, the engine management system may be interrupted in order to prevent damage to the motor vehicle.

Figure 5A:
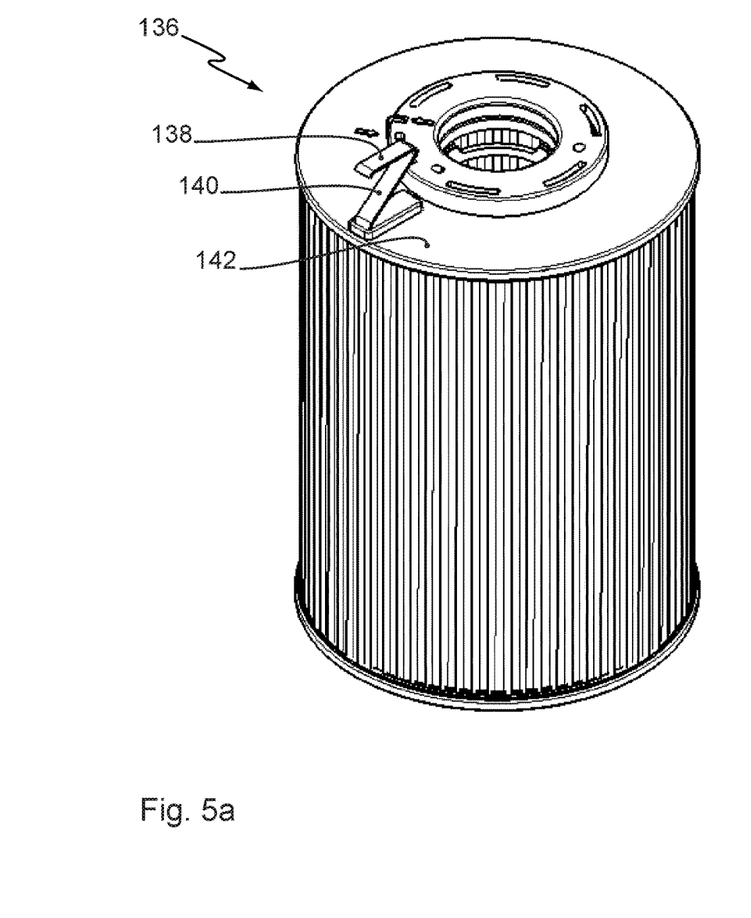
FIG. 5a is a perspective elevation of a fifth water separator element.

FIG. 5*a* depicts a fifth water separator element 136. The fifth water separator element 136 corresponds to the fourth water separator element 110 according to FIG. 4*a*. In contrast to the fourth water separator element 110, the fifth water separator element 136 has a shorting bridge 138 that comprises both the first water separator element electrode and the second water separator element electrode, the water separator element electrodes being connected via an electrical lead. The first water separator element electrode and the second water separator element electrode represent different segments of the shorting bridge 138. The shorting bridge 138 is connected via an elastic water separator element part 140 to a water separator element body 142 of the fifth water separator element 136. The shorting bridge 138 is embodied from an electrically conductive material, preferably metal.

Figure 5B:
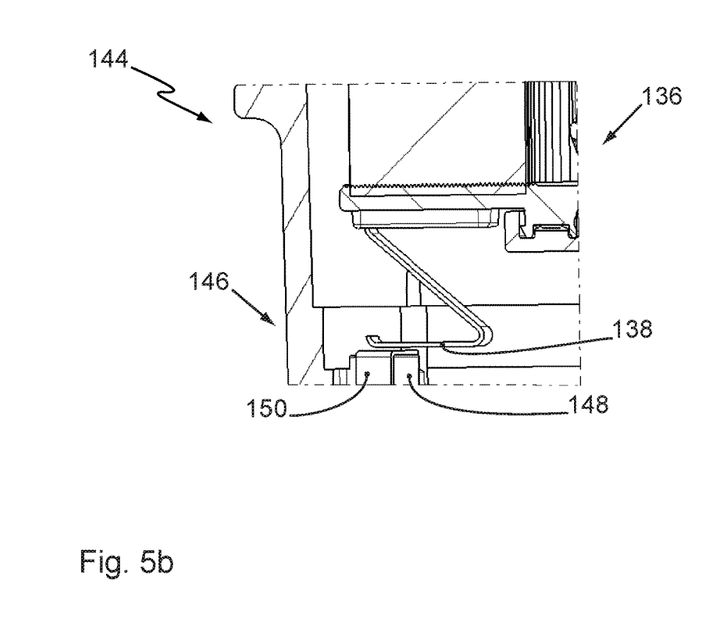
FIG. 5b is a partial sectional view of the fifth water separator element according to FIG. 5a in a third filter housing.

FIG. 5*b* depicts a third filter 144. The third filter 144 has the fifth water separator element 136, which, compared to being "head down" in FIG. 4*a*, is built into a third filter housing 146. The third filter housing 146 has a first filter housing electrode 148 and a second filter housing electrode 150. A voltage may be applied between the first filter housing electrode 148 and the second filter housing electrode 150. When the fifth water separator element 136 is installed in the third filter housing 146, the filter housing electrodes 148, 150 are electrically bridged by the electrically connected water separator element electrodes of the shorting bridge 138. Because of this, it is possible to check that the fifth water separator element 136 is correctly seated in the third filter housing 146. Moreover, it is possible to check whether the fifth water separator element 136 is an imitation.

The filter housing electrodes 148, 150 may be embodied radially symmetrical to the longitudinal axis of the third filter housing 146 in order to be able to use the fifth water separator element 136 rotated about its longitudinal axis as desired in the third filter housing 146.

The first filter housing electrode 148 and/or the second filter housing electrode 150 may be embodied in the form of an electrically conductive plate, especially a metal plate.

Alternatively to the third filter housing 146, the second filter housing 126 according to FIG. 4*b* may be used in combination with the fifth water separator element 136 according to FIG. 5*a*.

Figure 6A:
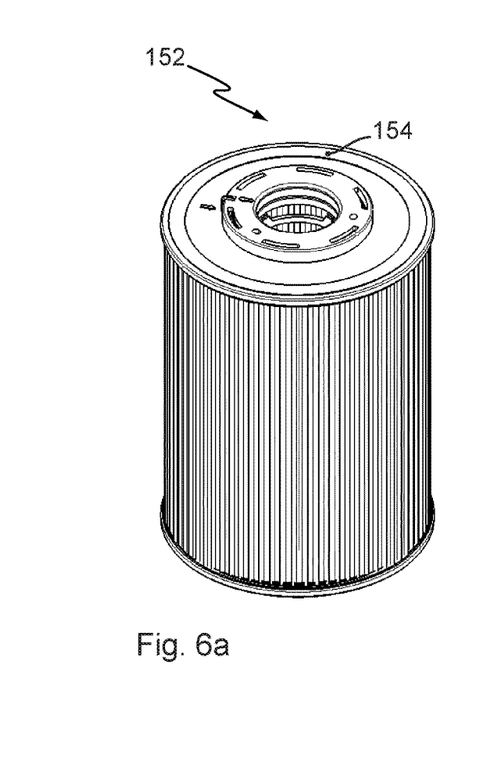
FIG. 6a is a perspective elevation of a sixth water separator element.

FIG. 6*a* depicts a sixth water separator element 152. The sixth water separator element 152 corresponds to the fifth water separator element 136 according to FIG. 5*a*. In contrast to the fifth water separator element 136, the sixth water separator element 152 has a shorting bridge 154 in the form of a ring.

Figure 6B:
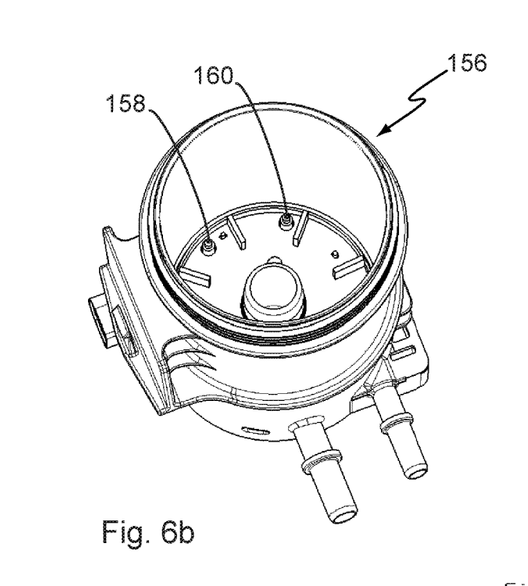

FIG. 6*b* depicts a fourth filter housing 156. The fourth filter housing 156 has a first filter housing electrode 158 and a second filter housing electrode 160.

Figure 6C:
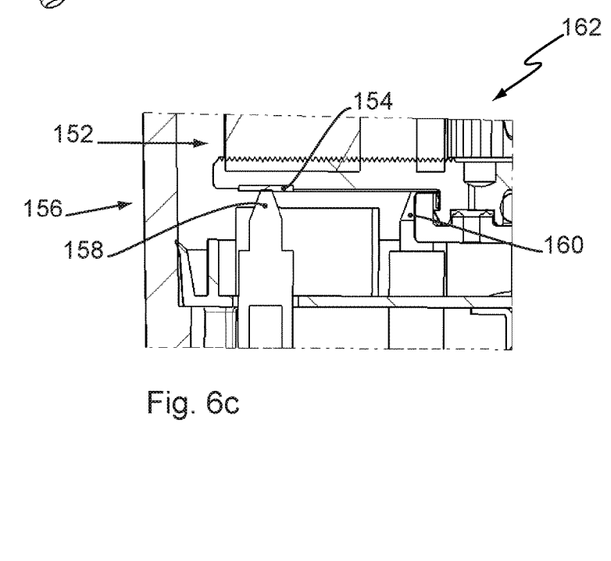
FIG. 6c is a partial sectional view of the fourth filter housing according to FIG. 6b with sixth water separator element according to FIG. 6a inserted therein.

FIG. 6*c* depicts a fourth filter 162. The fourth filter 162 has the fourth filter housing 156 according to FIG. 6*b*. The sixth water separator element 152 (according to FIG. 6*a*) of the fourth filter 162 is depicted "head down" in the fourth filter housing 156. The first filter housing electrode 158 is electrically short circuited with the second filter housing electrode 160 via the shorting bridge 154. The filter housing electrodes 158, 160 are embodied in the form of spring pins. The spring pins have elastic filter housing parts (not shown). A particularly reliable electrical contact is attained using the spring pins.

Figure 7A:
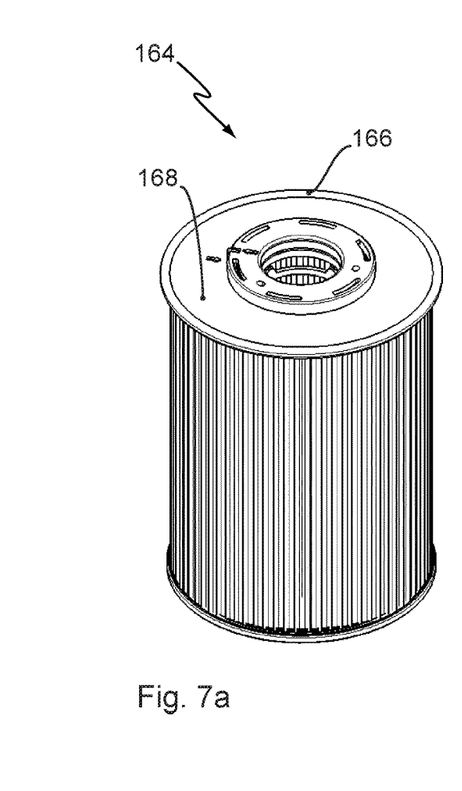
FIG. 7a is a perspective elevation of a seventh water separator element.

FIG. 7*a* depicts a seventh water separator element 164. The seventh water separator element 164 corresponds to the sixth water separator element 152 according to FIG. 6*a*. In contrast to the sixth water separator element 152, the seventh water separator element 164 has a first water separator element electrode ring 166 that annularly surrounds an end plate 168 of the seventh water separator element 164 at its exterior circumference. In different segments, the water separator element electrode ring 166 comprises a first water separator element electrode, a second water separator element electrode, and a direct electrical connection in the form of a shorting bridge between these water separator element electrodes.

Figure 7B:
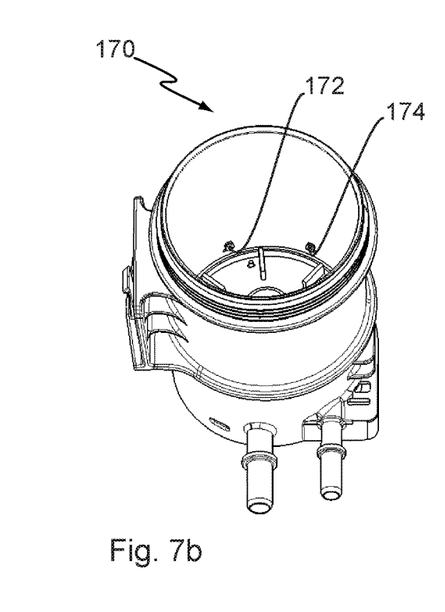

FIG. 7*b* depicts a fifth filter housing 170. The fifth filter housing 170 has a first filter housing electrode 172 and a second filter housing electrode 174.

Figure 7C:
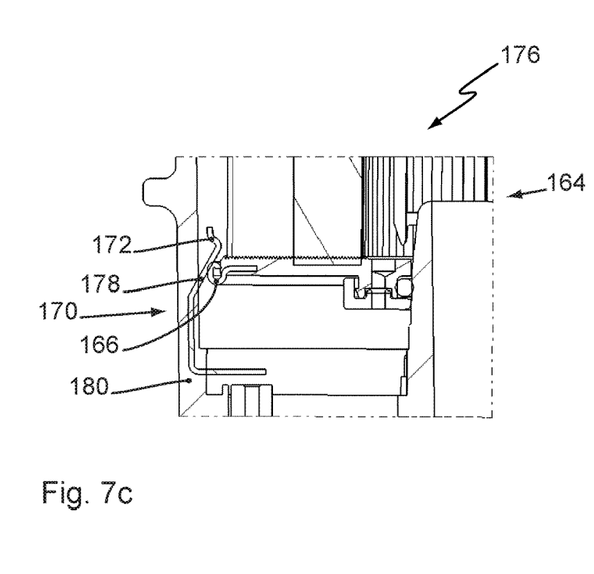
FIG. 7c is a partial sectional view of the fifth filter housing according to FIG. 7b with seventh water separator element according to FIG. 7a inserted therein.

FIG. 7*c* depicts a fifth filter 176. The fifth filter 176 comprises the fifth filter housing 170 according to FIG. 7*b* and the seventh water separator element 164 according to FIG. 7*a*. The seventh water separator element 164 is depicted "head down" in the fifth filter housing 170. When installed, the water separator element electrode ring 166 bridges the filter housing electrodes 172, 174 (see FIG. 7*b*; only the first filter housing electrode 172 is visible in FIG. 7*c*). It may be seen from FIG. 7*c* that the first filter housing electrode 172 is connected to a filter housing body 180 of the fifth filter housing 176 via an elastic filter housing part 178. The electrical connection between the filter housing electrodes 172, 174 and the water separator element electrodes of the water separator element electrode ring 166 is thus even retained after the seventh water separator element 164 has been installed and uninstalled multiple times. The second filter housing electrode (not shown) is also connected to the filter housing body 180 of the fifth filter housing 176 via an elastic filter housing part (not shown).

Figure 8:
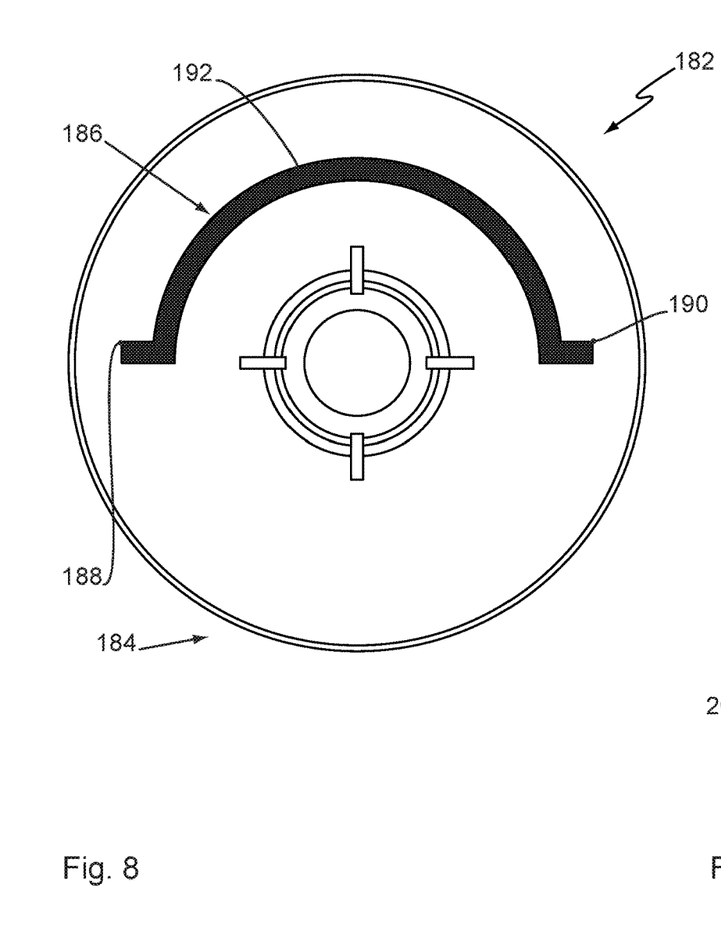
FIG. 8 is a top view of an eighth water separator element.

FIG. 8 depicts an eighth water separator element 182. The eighth water separator element 182 has an end plate 184. A shorting bridge in the form of a contact strip 186 made of metal is embodied on the end plate 184. The contact strip 186 may be present, for instance, in the form of a metal film. The contact strip 186 has a first water separator element electrode 188 and a second water separator element electrode 190. The water separator element electrodes 188, 190 are directly electrically connected via an ohmic lead 192. The ohmic lead 192 is embodied in the form of a segment of the contact strip 186.

Figure 9:
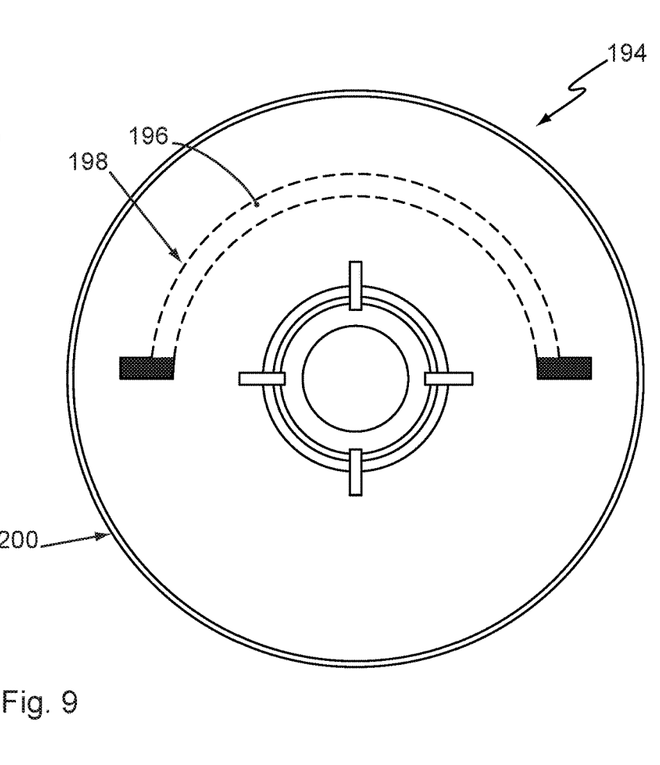
FIG. 9 is a top view of a ninth water separator element.

FIG. 9 depicts a ninth water separator element 194. The ninth water separator element 194 corresponds to the eight water separator element 182. However, a segment of the contact strip 198, embodied as an ohmic lead 196, covered by the plastic of an end plate 200, is inserted in the end plate 200. Because of this the ohmic lead 196 is less susceptible to damage.

In summary, the invention preferably relates to a multistage water separator element. The water separator element preferably has a particle filter medium, a coalescer medium, a sedimentation opening, and a screen support having a final separator screen. Preferably two water level electrodes are arranged on the screen support. The water level electrodes are embodied such that they project into a water collection chamber of a filter housing when the water separator element is installed in the filter housing. Each water level electrode may be contacted via one contact electrode that is preferably essentially annular. The contact electrodes may be contacted using tapping electrodes of a center tube element. In this case, the screen support preferably has, in the water separator element longitudinal direction toward the water level electrodes, a closed receiving shaft for the center tube element so that it is not necessary to provide a seal between center tube element and screen support.

What is claimed is:

1. A water separator element for a fuel filter, comprising:
 two water level electrodes arranged on the water separator element and configured to detect accumulated water in a water collection chamber of the fuel filter;
 wherein the water level electrodes are electrically contactable via two contact electrodes;
 wherein the contact electrodes are connected in an electrically conductive manner to the water level electrodes;
 wherein the water separator element has a final separator screen for separating water, the final separator screen being arranged or embodied in a screen support, wherein the screen support is arranged or embodied radial to a water separator element longitudinal axis;
 wherein the contact electrodes are arranged or embodied in an interior chamber of the screen support, the contact electrodes each being contactable using a tapping electrode embodied resiliently, at least in part, and the tapping electrodes being arranged or embodied, at least in segments, oriented radially outward on a center tube element of the filter.

2. The water separator element according to claim 1, in which the water separator element has a particle filter medium that is supported on the center tube element.

3. The water separator element according to claim 2, in which the water separator element has a sedimentation opening for separating water, in which the water separator element has a coalescer medium for separating water, in which the particle filter medium, the coalescer medium, the sedimentation opening, and the final separator screen being arranged successively radial to the water separator element longitudinal axis.

4. The water separator element according to claim 1, in which the water separator element has a sedimentation opening for separating water.

5. The water separator element according to claim 1, in which the water separator element has a coalescer medium for separating water.

6. The water separator element according to claim 1, in which a first contact electrode of the two contact electrodes is embodied annularly radial to the water separator element longitudinal axis.

7. The water separator element according to claim 6, in which a second contact electrode of the two contact electrodes is embodied annularly radial to the water separator element longitudinal axis.

8. The water separator element according to claim 1, in which the contact electrodes are arranged or embodied, at least in part, on an end plate of the water separator element.

9. The water separator element according to claim 1, in which a first water level electrode is connected via an electrical connecting line to a first contact electrode that is outwardly disposed relative to the water separator element longitudinal axis and a second water level electrode is connected to a second contact electrode that is inwardly disposed with respect to the water separator element longitudinal axis, at least part of the connecting line running embedded in an end plate of the water separator element between the second contact electrode and an under side of the end plate.

10. The water separator element according to claim 1, in which the water separator element has a particle filter medium that is supported on a center tube,
 in which the screen support and/or the center tube is connected via a snap-on connector to an end plate of the water separator element, the water level electrodes each being electrically connected to the contact electrodes via an interruptible resilient contact when the screen support is locked to the end plate.

11. The water separator element according to claim 1, in which the water level electrodes are each embodied integrally with the contact electrodes.

12. The water separator element according to claim 1, in which the screen support is embodied closed on an underside facing towards the water level electrodes in the region of the center tube element.

13. The water separator element according to claim 1, the water separator element having an electrically conductive shorting bridge for electrically bridging at least two filter housing electrodes arranged or embodied on an interior of a filter housing.

* * * * *